US011062207B2

(12) United States Patent
Giering et al.

(10) Patent No.: US 11,062,207 B2
(45) Date of Patent: Jul. 13, 2021

(54) CONTROL SYSTEMS USING DEEP REINFORCEMENT LEARNING

(71) Applicant: United Technologies Corporation, Farmington, CT (US)

(72) Inventors: Michael J. Giering, Bolton, CT (US); Kishore K. Reddy, Vernon, CT (US); Vivek Venugopalan, Bridgewater, NJ (US); Amit Surana, West Hartford, CT (US); Soumalya Sarkar, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 927 days.

(21) Appl. No.: 15/797,035

(22) Filed: Oct. 30, 2017

(65) Prior Publication Data

US 2018/0129974 A1    May 10, 2018

Related U.S. Application Data

(60) Provisional application No. 62/417,804, filed on Nov. 4, 2016.

(51) Int. Cl.
| G06N 3/08 | (2006.01) |
| G06N 20/00 | (2019.01) |
| G05B 13/02 | (2006.01) |
| G06N 3/04 | (2006.01) |
| G06N 5/02 | (2006.01) |

(52) U.S. Cl.
CPC ............. G06N 3/08 (2013.01); G05B 13/027 (2013.01); G05B 13/029 (2013.01); G06N 3/0454 (2013.01); G06N 5/022 (2013.01); G06N 20/00 (2019.01)

(58) Field of Classification Search
None
See application file for complete search history.

(56) References Cited

U.S. PATENT DOCUMENTS

| 2017/0228662 | A1* | 8/2017 | Gu ........................ G06N 3/0427 |
| 2017/0270434 | A1* | 9/2017 | Takigawa ............... G06N 3/084 |
| 2018/0095450 | A1* | 4/2018 | Lappas ................... G06T 19/00 |

(Continued)

OTHER PUBLICATIONS

EP Patent Application No. 17200012.7, Office Action dated Jun. 14, 2019, 8 pages.

(Continued)

*Primary Examiner* — Alan Chen
(74) *Attorney, Agent, or Firm* — Cantor Colburn LLP

(57) ABSTRACT

Data indicative of a plurality of observations of an environment are received at a control system. Machine learning using deep reinforcement learning is applied to determine an action based on the observations. The deep reinforcement learning applies a convolutional neural network or a deep auto encoder to the observations and applies a training set to locate one or more regions having a higher reward. The action is applied to the environment. A reward token indicative of alignment between the action and a desired result is received. A policy parameter of the control system is updated based on the reward token. The updated policy parameter is applied to determine a subsequent action responsive to a subsequent observation.

14 Claims, 9 Drawing Sheets

(56) References Cited

U.S. PATENT DOCUMENTS

2019/0232488 A1* 8/2019 Levine ............... G05B 19/042
2019/0258929 A1* 8/2019 Mnih .................. G06N 3/04

OTHER PUBLICATIONS

C. J. Watkins, et al., "Q-learning," Machine learning, vol. 8, No. 3-4, pp. 279-292, 1992.
Ian Lenz, et al., Deepmpc: Learning deep latent features for model predictive control, New York: American Elsevier Pub. Co. ISBN 0-444-00070-4, 1970, 9 pages.
Long-Ji Lin, "Reinforcement Learning for Robots Using Neural Networks," DTIC Document, Tech. Rep., 1993, 168 pages.
Matthew J. Flausknecht, et al., Deep recurrent q-learning for partially observable mdps, CoRR, abs/1507.06527, 2015, 9 pages.
Sergey Levine, et al., End-to-end training of deep visuomotor policies, arXiv preprint arXiv:1504.00702, 2015, 40 pages.
Sergey Levine, et al., Guided policy search. In Proceedings of the 30th International Conference on Machine Learning, ICML 2013, Atlanta, GA, USA, Jun. 16-21, 2013, pp. 1-9, 2013.
Sergey Levine, et al., Learning complex neural network policies with trajectory optimization, In Tony Jebara and Eric P. Xing, editors, Proceedings of the 31st International Conference on Machine Learning (ICML-14), pp. 829-837. JMLRWorkshop and Conference Proceedings, 2014.
Sergey Levine, et al., Learning neural network policies with guided policy search under unknown dynamics, In Z. Ghahramani, M. Welling, C. Cortes, N.D. Lawrence, and K.Q. Weinberger, editors, Advances in Neural Information Processing Systems 27, pp. 1071-1079. Curran Associates, Inc., 2014.
Sergey Levine, et al., Variational policy search via trajectory optimization, In C.J.C. Burges, L. Bottou, M. Welling, Z. Ghahramani, and K.Q. Weinberger, editors, Advances in Neural Information Processing Systems 26, pp. 207-215. Curran Associates, Inc., 2013.
Sergey Levine, Exploring deep and recurrent architectures for optimal control, CoRR, abs/1311.1761, 2013, 8 pages.
Shixiang Gu, et al., Continuous deep q-learning with model-based acceleration, CoRR, abs/1603.00748, 2016, 13 pages.
Tianhao Zhang, et al., Learning deep control policies for autonomous aerial vehicles with mpc-guided policy search, CoRR, abs/1509.06791, 2015, 8 pages.
V. Mnih, et al., "Playing Atari with Deep Reinforcement Learning," arXiv preprint arXiv:1312.5602, 2013, 9 pages.
V. Mnih, K. Kavukcuoglu, et al.,"Human-Level Control Through Deep Reinforcement Learning," Nature, vol. 518, No. 7540, pp. 529-533, 2015.
Weiwei Li, et al., Iterative linear quadratic regulator design for nonlinear biological movement systems, In ICINCO (1), pp. 222-229, 2004.
Yan Duan, et al., Benchmarking deep reinforcement learning for continuous control, CoRR, abs/1604.06778, 2016, 14 pages.
E. Tzeng, et al., "Towards Adapting Deep Visuomotor Representations from Simulated to Real Environments," Apr. 12, 2016, XP055461260, Retrieved from the Internet: URL:https://arxiv.org/pdf/1511.07111v3.pdf [retrieved on Mar. 20, 2018]. 10 pages.
EP Application No. 17200012.7 Extended European Search Report dated Apr. 3, 2018, 9 pages.
P. Fauchais et al., "Thermal and Cold Spray: Recent Developments," Key Engineering Materials, vol. 384, Jan. 1, 2008, pp. 1-59, XP055461124, DOI: 10.4028/www.scientific.net/KEM.384.1 p. 30.
S. James et al., "3D Simulation for Robot Arm Control with Deep Q-Learning," Arxiv.org, Cornell University Library, Sep. 13, 2016, XP080726255, Abstract; Sections I-III, IV.A, IV.E: figure 2, 8 pages.

* cited by examiner

CONTROL SYSTEMS USING DEEP REINFORCEMENT LEARNING

CROSS-REFERENCE TO RELATED APPLICATION

This application claims the benefit of priority to U.S. Provisional Application No. 62/417,804 filed Nov. 4, 2016, the disclosure of which is incorporated herein by reference in its entirety.

BACKGROUND

Exemplary embodiments pertain to the art of control systems, and more particularly to control systems using deep reinforcement learning.

Most practical applications of reinforcement learning rely on policy classes that are hand-engineered and domain-specific, or restricted to following a single trajectory. Neither approach is likely adequate for learning the sorts of rich motion repertoires that might be needed, for example, for a robot that must execute a variety of tasks in a natural environment.

The application of powerful models like deep neural networks to control has been limited in part due to a shortage of effective learning algorithms that can handle such rich policy classes while also addressing the sorts of complex tasks that can actually benefit from the increased representational power. Although the use of multilayer networks has been explored in low complexity problems, such methods typically use small controllers for relatively simple tasks. Early experiments with neural network control represented both the system dynamics and policy as neural networks, so that the gradient of the policy could be propagated backwards in time. However, this direct optimization approach can produce highly unstable gradients, and is often unsuitable for learning nontrivial behaviors.

BRIEF DESCRIPTION

Disclosed is a method that includes receiving data indicative of a plurality of observations of an environment at a control system. Machine learning using deep reinforcement learning is applied to determine an action based on the observations. The deep reinforcement learning applies a convolutional neural network or a deep auto encoder to the observations and applies a training set to locate one or more regions having a higher reward. The action is applied to the environment. A reward token indicative of alignment between the action and a desired result is received. A policy parameter of the control system is updated based on the reward token. The updated policy parameter is applied to determine a subsequent action responsive to a subsequent observation.

In addition to one or more of the features described above, or as an alternative to any of the foregoing embodiments, further embodiments may include where the deep reinforcement learning applies a guided policy search.

In addition to one or more of the features described above, or as an alternative to any of the foregoing embodiments, further embodiments may include where the deep reinforcement learning applies a deep Q-network.

In addition to one or more of the features described above, or as an alternative to any of the foregoing embodiments, further embodiments may include where the updating of the policy parameter is performed in a simulation environment to develop control policies to apply to a physical environment.

In addition to one or more of the features described above, or as an alternative to any of the foregoing embodiments, further embodiments may include where the action controls a nozzle in a coldspray application, and the observations determine a deposit characteristic on a surface.

In addition to one or more of the features described above, or as an alternative to any of the foregoing embodiments, further embodiments may include where the action controls a refurbishing process, and the observations determine a deposit characteristic on a surface.

In addition to one or more of the features described above, or as an alternative to any of the foregoing embodiments, further embodiments may include where the action includes a classification of one or more defects in a structure, and a visual indication of the classification of the one or more of defects in the structure is output.

In addition to one or more of the features described above, or as an alternative to any of the foregoing embodiments, further embodiments may include where the action includes controlling alignment of a plurality of sensors.

In addition to one or more of the features described above, or as an alternative to any of the foregoing embodiments, further embodiments may include where the action includes controlling movement of at least one elevator cab.

In addition to one or more of the features described above, or as an alternative to any of the foregoing embodiments, further embodiments may include where the training set is configured at least in part based on expert knowledge input.

Also disclosed is a system including a control system and a processing system. The processing system is operable to receive data indicative of a plurality of observations of an environment at the control system, apply machine learning using deep reinforcement learning to determine an action based on the observations, apply the action to the environment, receive a reward token indicative of alignment between the action and a desired result, update a policy parameter of the control system based on the reward token, and apply the updated policy parameter to determine a subsequent action responsive to a subsequent observation. The deep reinforcement learning applies a convolutional neural network or a deep auto encoder to the observations and applies a training set to locate one or more regions having a higher reward.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed systems and methods are presented herein by way of exemplification and not limitation with reference to the Figures. Embodiments use deep reinforcement learning for control system operation and optimization, as well as feature identification. Reinforcement learning (RL) can be used to learn to control agents from sensor outputs, such as speech or video. Deep reinforcement learning (DRL) can be used to actively to target problems that interact with the environment and learn by maximizing a scalar reward signal. Deep learning algorithms may require large amounts of labelled training data to generate a robust model that can be used for inference on testing data. RL algorithms learn from a scalar reward signal that is typically sparse, noisy and delayed. DRL can use a deep neural network (DNN), such as a convolutional neural network (CNN), a deep auto encoder such as a convolutional auto encoder (CAE), or other such neural network as the agent to generate the reward after learning from the sensor outputs. The selection of a particular DNN may be based on the sensor type, where a CNN may be used for imaging/ranging sensor data, and a CAE may be used for time sequenced sensor data, for example. The DNN can be trained with a variant of a Q-learning algorithm, where weights are updated using stochastic gradient descent. Combining a DNN, such as a CNN, with Q-learning as a form of reinforcement learning may be referred to as a deep Q-network (DQN). Experience replay is another technique used to store the agent's experiences at each time step, $e_t=(s_t, a_t, r_t, s_{t+1})$ in a dataset $D=e_1, \ldots, e_N$. This dataset D can be pooled over many episodes into replay memory. Here, s denotes the sequence, a denotes the action, and r denotes the reward for a specific timestep.

Figure 1:
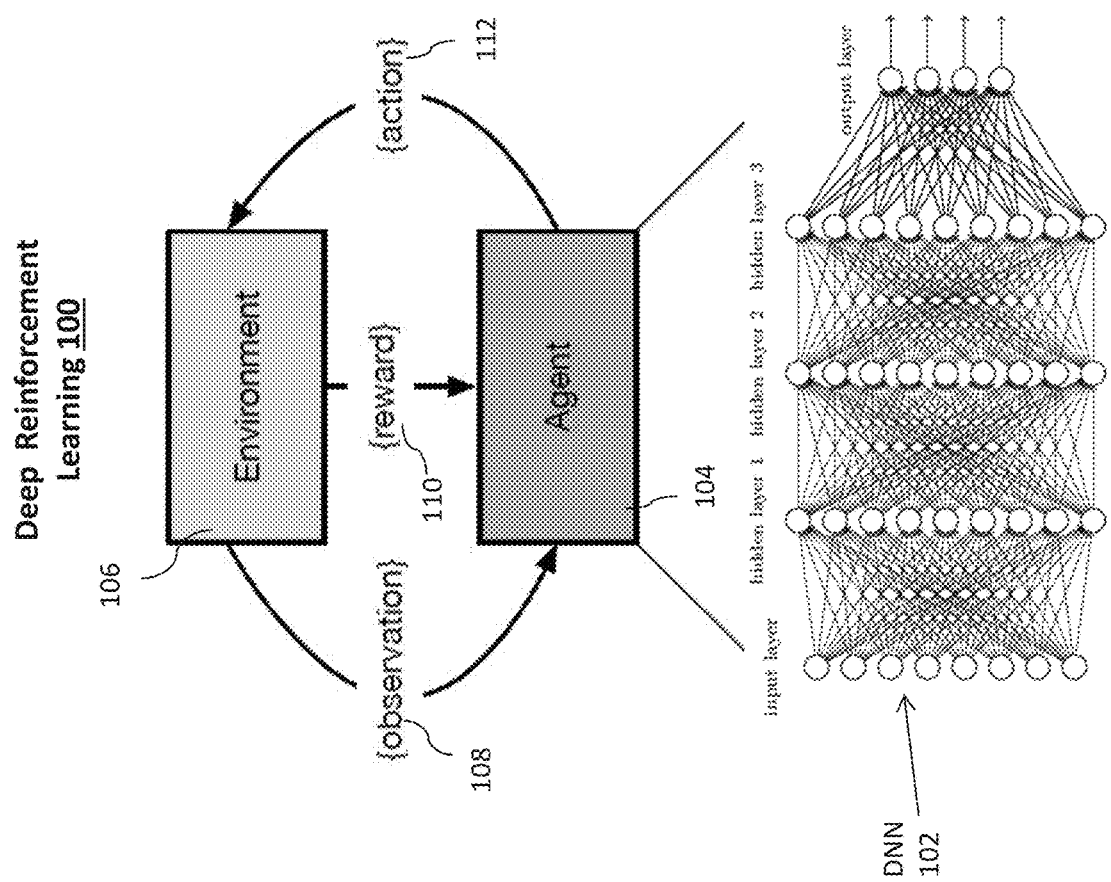
FIG. 1 illustrates a deep reinforcement learning process according to an embodiment.

FIG. 1 shows a DRL process 100 with a DNN 102 assuming the role of an agent 104 with respect to environment 106. The environment 106 can supply observations 108, such as sensor data, and a reward 110 to the agent 104. After experience replay, the agent 104 selects and executes an action 112 as per a pre-defined greedy policy. The environment 106 can be a wide range of environments, such as a manufacturing environment, an aerospace environment, a building environment, an inspection environment, a roadway environment, an underwater environment, and any other environment where observations 108 can be made.

As one example, the DNN 102 can be can be implemented as a CNN including a feedforward artificial neural network that has more than one layer of hidden units between its inputs and outputs. Each hidden unit, j, uses a nonlinear mapping function, often the logistic function, to map its total input from the layer below, $x_j$, to the scalar state, $y_j$, that it sends to the layer above, where $b_j$ is the bias of unit j, i is an index over units in the layer below, and $w_{ij}$ is the weight to unit j from unit i in the layer below. The values of $y_j$ and $x_j$ can be computed as:

$$y_j = \frac{1}{1+e^{-x_j}} \text{ where } x_j = b_j + \sum_i y_i w_{ij}.$$

Convolution in a CNN can be performed at convolutional layers to extract local structure features from the features of the previous layer. An additive bias can be applied at this point followed by a local pooling step. A nonlinear mapping (e.g., a sigmoid) can be applied after either the convolution or pooling layer and can vary by implementation. The convolution and pooling steps can be iteratively repeated. The value for each spatial point (x,y) on the jth feature map in the ith layer can be denoted as v, where $b_{ij}$ is the bias for the feature map, m indexes over the set of feature maps in the (i−1)th layer connected to the current feature map, w is the value at the position (p,q) of the kernel connected to the kth feature map, and $P_i$ and $Q_i$ are the height and width of the kernel respectively as follows: $v_{ij}^{xy}=\tan h(b_{ij}+\Sigma_m \Sigma_p^{P_{i-1}} w_{ijm}^{pq} v_{(i-1)m}^{(x+p)(y+q)})$.

In the example DRL process 100, weights can be updated with each step of the experience permitting greater data efficiency. Randomizing samples can break a strong correlation between the samples and thus reduces the variances in the weight updates. The next set of parameters fed to a training phase is determined by the set of current parameters and the pre-defined policy. Experience replay can average behavior distribution over many of its previous states thus smoothing the learning and avoiding oscillations/divergence in the parameters.

Reinforcement learning can be performed using policy classes that may represent any behavior without extensive hand-engineering. Learning hierarchical structures in control and reinforcement learning can improve generalization and transfer. Multilayer neural networks, such as autoencoders (e.g., CAEs) and CNNs, can be applied to a number of perception tasks. Policy search methods can allow systems to learn control policies for a wide range of tasks. A guided policy search approach transforms a policy search into a supervised learning problem, where a training set (which guides the policy search to regions of high reward) is generated by trajectory-centric algorithms. Training data from the policy's own state distribution helps to reduce the risk of compounding errors. An iterative procedure can be used to adapt the trajectories to the policy, alternating between optimizing the policy to match the trajectories, and optimizing the trajectories to minimize cost and match the policy, such that at convergence, the same state distribution is achieved.

A finite horizon stochastic optimal control problem can be defined as $$\min_{\pi_\theta} \mathbb{E}_{\pi_\theta}\left[\sum_{t=1}^T c(s_t, u_t)\right], \quad (1)$$

where, c(s, u) is the cost function, and the expectation $\mathbb{E}$ is taken under the policy $\pi_\theta(u_t|s_t)$ which is parameterized by θ. A trajectory realization is denoted by $\tau=\{s_1, u_1, s_2, u_2, \ldots s_T, u_T\}$ with a probability under $\pi_\theta$ is given by:

$$\pi_\theta(\tau) = p(s_1)\prod_{t=1}^T \pi(u_t|s_t)p(s_{t+1}|s_t, u_t). \quad (2)$$

where, $p(s_{t+1}|s_t, u_t)$ is the state transition probability for the Markov system dynamics. For brevity $c(\tau)=\Sigma_{t=1}^T c(s_t, u_t)$. Let $q(\tau)$ be a guiding distribution over trajectories, so that $$q(\tau) = p(s_1)\prod_{t=1}^{T} q(u_t|s_t)p(s_{t+1}|s_t, u_t), \quad (3)$$

The problem can be reformulated as:

$$\min_{q,\pi_\theta} \mathbb{E}_q[c(\tau)], \quad (4)$$

$$q(u_t|s_t) = \pi_\theta(u_t|s_t), \forall t, s_t, u_t. \quad (5)$$

This formulation is equivalent to the original problem, since the constraint forces the two distributions to be identical. If the initial state distribution $p(s_1)$ is approximated with samples $s_1^i$, q can be selected as class of distributions that is much easier to optimize that $\pi_\theta$. The constrained problem can be solved by a dual descent method, which alternates between minimizing a Lagrangian with respect to the primal variables, and incrementing Lagrange multipliers by their subgradient.

The probability of a trajectory $\tau=\{s_1, u_1, s_2, u_2, \ldots s_T, u_T\}$ under $q_i$ can be given by:

$$q_i(\tau) = p(s_1)\prod_{t=1}^{T} q_i(u_t|s_t)p(s_{t+1}|s_t, u_t). \quad (6)$$

where, $p(s_{t+1}|s_t, u_t)$ is the state transition probability for the Markov system dynamics, i.e. the forward simulation. So to sample trajectories for DNN training: where, $p^i(s_1)$ is the initial distribution can be performed according to the following algorithm:

```
for j = 1: N do
    s_t^{ij} ~ p^i(s_1)
    for t = 1: T do
        Sample u_t^{ij} ~ q_i(· |s_t^{ij})
        Sample s_{t+1}^{ij} ~ p(· |s_t^{ij}, u_t^{ij}) which is forward simulation
    end for
end for
```

A guided policy search can be performed, for example, according to the following algorithm:
For iterations k=1 to K do
    Optimize trajectories $q_i(u_t|s_t)=\mathcal{N}(u_t; \mu_t^{qi}(s_t), \Sigma_t^{qi})$ to minimize cost and deviations from the policy $\pi_\theta(u_t|s_t)=\mathcal{N}(u_t; \mu^\pi(s_t),\Sigma^\pi)$
    Generate samples $\{s_t^{ij}:j=1:N, t=1:T\}$ from each $q_i$, i=1 ..., M
    Train nonlinear policy $\pi_\theta$ to match the sampled trajectories
    To encourage agreement between $q_i$ and $\pi_\theta$, update the Lagrange multipliers End for
Return optimized policy parameter $\theta=(\mu^\pi, \Sigma^\pi)$.

A value of a can be chosen in range [0,1], where lower values typically lead to better numerical stability. The weights $\alpha_t$ are initialized to low values such as 0.01 and incremented based on the following schedule: at every iteration, the average KL-divergence between $q_i$ and $\theta$ is computed at each time step, as well as its standard deviation over time steps. The weights $v_t$ corresponding to time steps where the KL-divergence is higher than the average are increased by a factor of 2, and the weights corresponding to time steps where the KL-divergence is two standard deviations or more below the average are decreased by a factor of 2. The rationale behind this schedule is to adjust the KL-divergence penalty to keep the policy and trajectory in agreement by roughly the same amount at all time steps. Increasing $v_t$ too quickly can lead to the policy and trajectory becoming "locked" together, which makes it difficult for the trajectory to decrease its cost, while leaving it too low requires more iterations for convergence.

Figure 2:
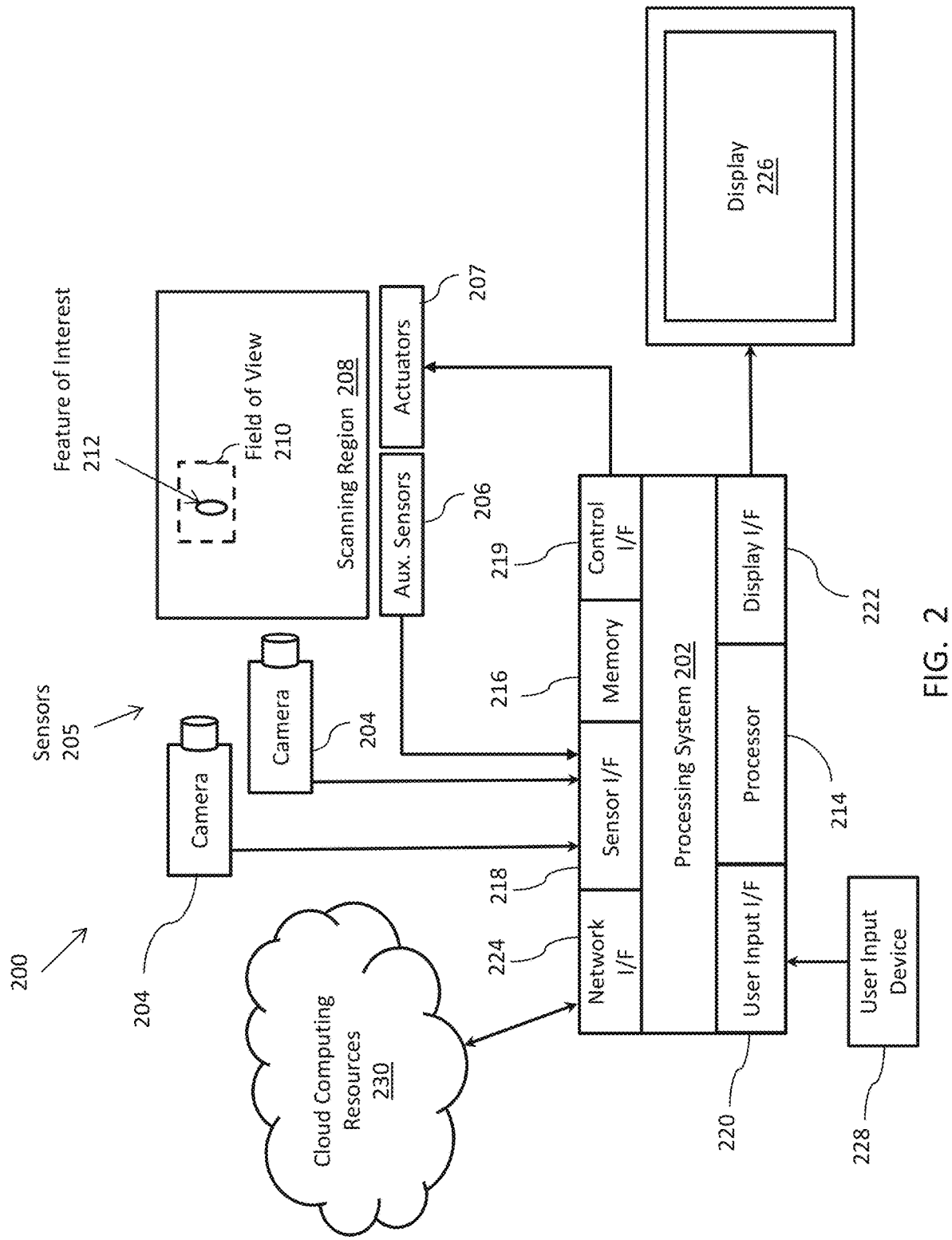
FIG. 2 illustrates a system according to an embodiment.

Referring now to FIG. 2, a system 200 is depicted that includes a processing system 202 and a plurality of sensors 205. The sensors 205 can include one or more cameras 204. The cameras 204 can any type of imaging or depth detection device such as Light Detection and Ranging (LiDAR), video, Radio Detection And Ranging (RADAR), Short Wavelength Infrared (SWIR), and the like. In some embodiments, one or more of the cameras 204 can be coupled to an imaging probe (not depicted), for instance, a boroscope camera. The cameras 204 can observe a scanning region 208, for instance, as observations 108 of environment 106 of FIG. 1. One or more of the cameras 204 can be used to gather data related to a feature of interest 212 within a field of view 210. The feature of interest 212 can vary depending upon the application, such as, a surface depth, a component defect, an object, a person, etc. The sensors 205 can also include auxiliary sensors 206, such as temperature sensors, pressure sensors, position sensors, force sensors, and the like. One or more actuators 207 can be controlled directly or indirectly by the processing system 202 as the action 112 of FIG. 1. The actuators 207 can effect positioning of the sensors 205 or another control aspect relative to the feature of interest 212.

The processing system 202 includes at least one processor 214, memory 216, a sensor interface 218, and a control interface 219. The processing system 202 can also include a user input interface 220, a display interface 222, a network interface 224, and other features known in the art. The processor 214 can be any type of central processing unit (CPU), including a microprocessor, a digital signal processor (DSP), a microcontroller, an application specific integrated circuit (ASIC), a field programmable gate array (FPGA), or the like. Also, in embodiments, the memory 216 may include random access memory (RAM), read only memory (ROM), or other electronic, optical, magnetic, or any other computer readable medium onto which is stored data and algorithms as executable instructions in a non-transitory form.

The processor 214 and/or display interface 222 can include one or more graphics processing units (GPUs) which may support vector processing using a single instruction multiple data path (SIMD) architecture to process multiple layers of data substantially in parallel for output on display 226. The user input interface 220 can acquire user input from one or more user input devices 228, such as keys, buttons, scroll wheels, touchpad, mouse input, and the like. In some embodiments the user input device 228 is integrated with the display 226, such as a touch screen. The network interface 224 can provide wireless and/or wired communication with one or more remote processing and/or data resources, such as cloud computing resources 230. The cloud computing resources 230 can perform portions of the processing described herein and may support model training.

Figure 3:
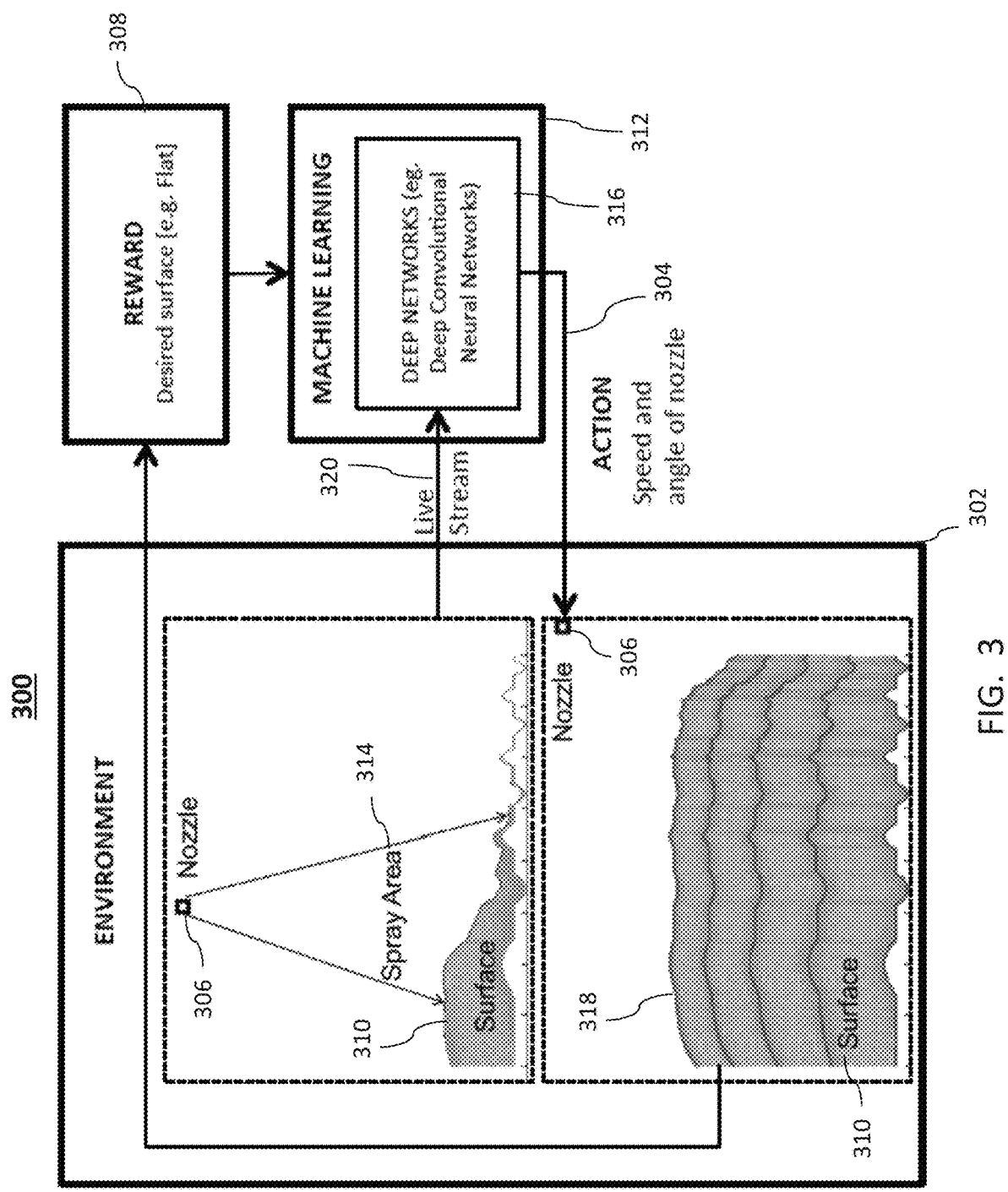
FIG. 3 illustrates an example of a coldspray application system using deep reinforcement learning according to an embodiment.

FIG. 3 depicts an example of a coldspray application system 300 using DRL. The system 300 can deposit material as part of a coldspray application DRL process, where the material being deposited indicates an environment 302. An action 304 taken is to control the speed and angle of a nozzle 306. A reward token 308 is achieving the desired finishing (e.g., flat). Given an uneven surface 310, machine learning 312 acts as a DRL agent to compute the speed and the angle of the nozzle 306 in a spray area 314 to achieve a flat surface that may be formed over multiple applications of material in layers 318. The machine learning 312 can use deep networks 316, such as the DNN 102 of FIG. 1, to perform DRL based on a live stream 320 of image and/or other sensor data and the reward token 308 for generating the action 304 to adjust the nozzle 306. Thus, the system 300 of FIG. 3 represents an embodiment of the system 200 of FIG. 2 applying the process 100 of FIG. 1, where environment 302 maps to environment 106, machine learning 312 maps to agent 104 as executed by processing system 202. Sensors 205 can produce live stream 320 as observation 108. The reward token 308 is an example of reward 110, and the action 304 is an example of action 112 that may be controlled by actuators 207. The surface 310 is a feature of interest 212.

Although described with respect to coldspray application in FIG. 3, such techniques can be broadly applied to many applications, such as robotics and additive manufacturing. With respect to nozzle spray applications, a problem formulation can focus on a cross section which spans $[r_0, r_1]$. The cross section can be discretized uniformly into N cells, and the depth of material deposited at time t at location $r_i = r_0 + idx$ can be denoted by $d_{it}$, where $$dx = \frac{r_1 - r_0}{N}.$$

Thus, the state of the material profile at time t can be described by a vector:

$$D_t = \begin{pmatrix} d_{1t} \\ d_{2t} \\ \vdots \\ d_{(N-1)t} \\ d_{Nt} \end{pmatrix} \tag{7}$$

The state of the nozzle 306 at time t will be described by it position and angle, denoted by $p_t$ and $\alpha_t$ respectively. Let $v_t$ be speed of nozzle and $\omega_t$ be angular speed, then dynamics of the nozzle 306 can be described by:

$$p_{t+1} = p_t + v_t dt \tag{8}$$

$$\alpha_{t+1} = \alpha_t + \omega_t dt. \tag{9}$$

The dynamics of material profile can be expressed as:

$$D_{t+1} = D_t + R(s_t, p_t, \alpha_t) dt \tag{10}$$

where, $R(s_t, p_t, \alpha_t) = (R_1(s_t, p_t, \alpha_t), \ldots, R_N(s_t, p_t, \alpha_t))'$ with $$R_i(D_t, p_t, \alpha_t) = \phi(\tan\theta_{it}, \tan\alpha_t) g(\cot\beta_{it}). \tag{11}$$

In above $\phi(\tan\theta_{it}, \tan\alpha_t)$ is the distribution of particles in spray cone with efficiency function $g(\cot\beta_{it})$, where $$\tan\theta_{it} = \frac{r_i - p_t}{h_t - d_{it}} \tag{12}$$

$$\cot\beta_{it} = \frac{(r_i - p_t) - (h_t - d_{it})S_{it}}{(h_t - d_{it}) + (r_i - p_t)S_{it}} \tag{13}$$

and $S_{it}$ is approximation of material slope at grid i, which can be obtained via:

$$S_{it} = \begin{cases} \frac{d_{2t} - d_{1t}}{dx}, & i = 1 \\ \frac{d_{Nt} - d_{(N-1)t}}{dx}, & i = N \\ \frac{d_{(i+1)t} - d_{(i-1)t}}{2dx}, & \text{otherwise} \end{cases} \tag{14}$$

The functional form of $\phi$ and g is given by $$\phi(\tan\theta, \tan\alpha) = 1 - \left(1 + \frac{\rho}{(\tan\theta - \tan\alpha)^k}\right)^{-1} \tag{15}$$

for some integer $k \geq 1$ and $$g(\cot\beta) = \frac{1}{R}\left(0.5 + \frac{\operatorname{atan}(-a\max(|\cot\beta/b|^\kappa, 1))}{\pi}\right) \tag{16}$$

where, p, a, b, κ are parameters and R is normalization constant. In summary, the dynamical model can be expressed as $$s_{t+1} = f(s_t, u_t) \tag{17}$$

where, $s_t = (D'_t, p_t, \alpha_t)'$, $u_t = (v_t, \omega_t)'$ and $$f(s_t, u_t) = \begin{pmatrix} d_{1t} + R_1(D_t, p_t, \alpha_t) dt \\ \vdots \\ d_{Nt} + R_N(D_t, p_t, \alpha_t) dt \\ p_t + v_t dt \\ \alpha_t + \omega_t dt \end{pmatrix} \tag{18}$$

with initial material profile given by $D_0$, and initial position angle of nozzle $p_0$ and $\alpha_0$, respectively.

Given initial condition $s_0 = (D'_0, p_0, \alpha_0)'$, the objective is to determine control $u_t = (v_t, \omega_t)'$, $t = 1, \ldots, T$ sequence such that final material profile matches a prescribed profile $D_f$ $$\min_{u_1, \ldots, u_T} \|D_T - D_f\|^2 + \sum_{t=1}^{T-1} c(s_t, u_t) \tag{19}$$

where, for instance $$c(s_t, u_t) = \frac{w_1}{v_t} + w_2 \omega_t^2$$

which is a weighted sum of the time to complete the pass and penalty on angular rate. Additionally, there can be bounds on velocity and angular rates $0 < v_{min} \leq v_t \leq v_{max}$ and similar for $\omega_{min} \leq \omega_t \leq \omega_{max}$.

Figure 4:
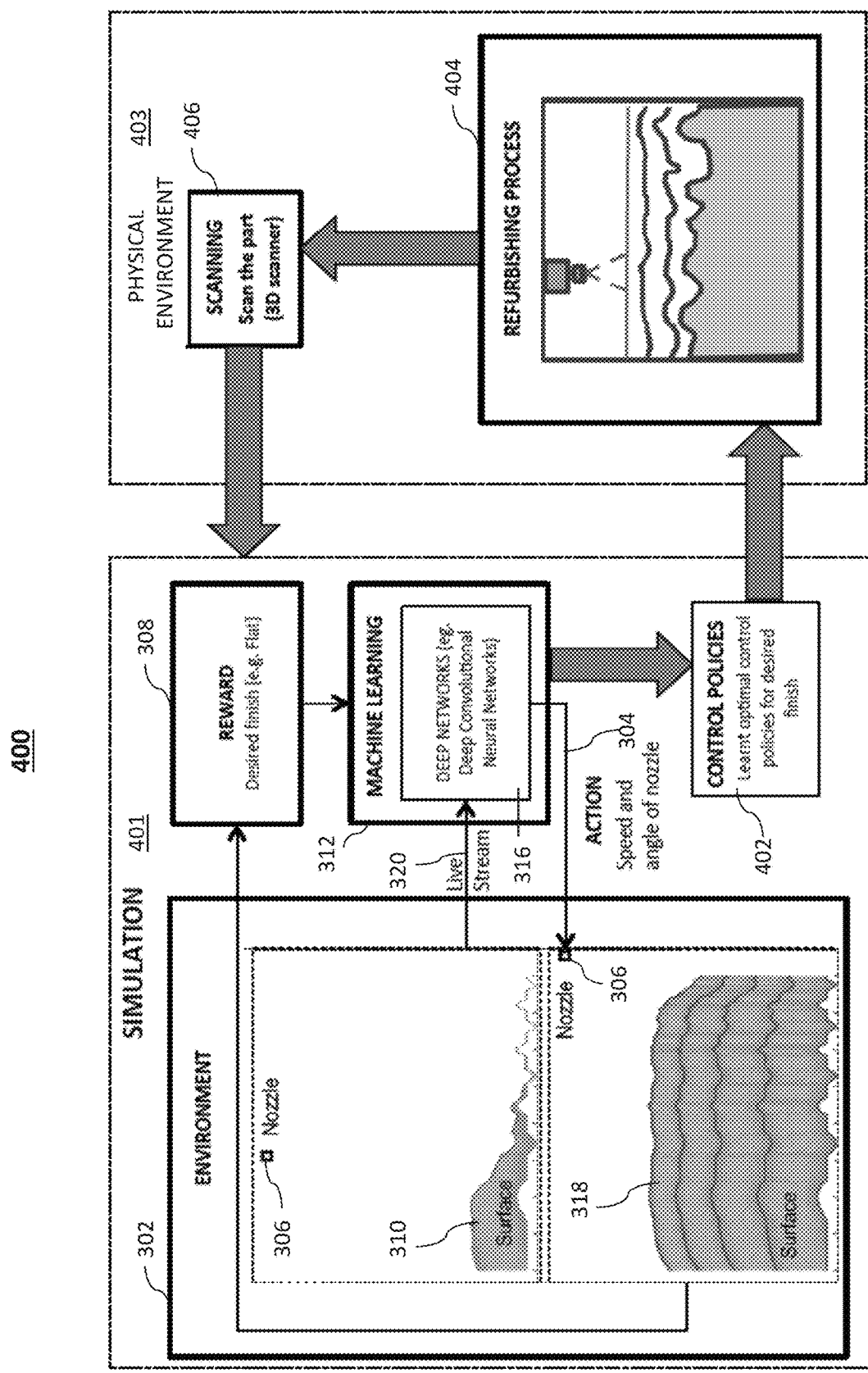
FIG. 4 illustrates an example of a component refurbishing system using deep reinforcement learning according to an embodiment.

FIG. 4 illustrates an example of a component refurbishing system 400 using DRL. The system 400 includes a simulation 401 and a physical environment 403. The simulation 401 can run a simulated version of the system 300 of FIG. 3 including like numbered elements of FIG. 3 within the simulation 401 of FIG. 4. Rather than learning control policies of a refurbishing process 404 within the physical environment 403, the simulation 401 applies machine learning 312 and deep learning 316 to learn control policies 402 needed to achieve the desired finish defined by the reward token 308. The live stream 320 can be simulated image data based on modeled properties of the nozzle 306, surface 310, and material to form layers 318 through action 304 in environment 302. The control policies 402 for the desired finish can be fed to the refurbishing process 404. A 3D scanner 406 (e.g., one of the sensors 205 of FIG. 2) can scan a part and check for anomalies. If there is no anomaly and the desired finish is obtained, it is an input to the simulation 401 as a reward token. DRL can evolve over time in identifying an uneven surface without computer vision algorithms for depth perception.

Figure 9:
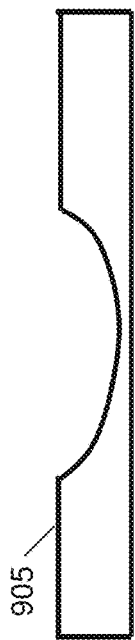
FIG. 9 depicts a machining process.
Figure 11:
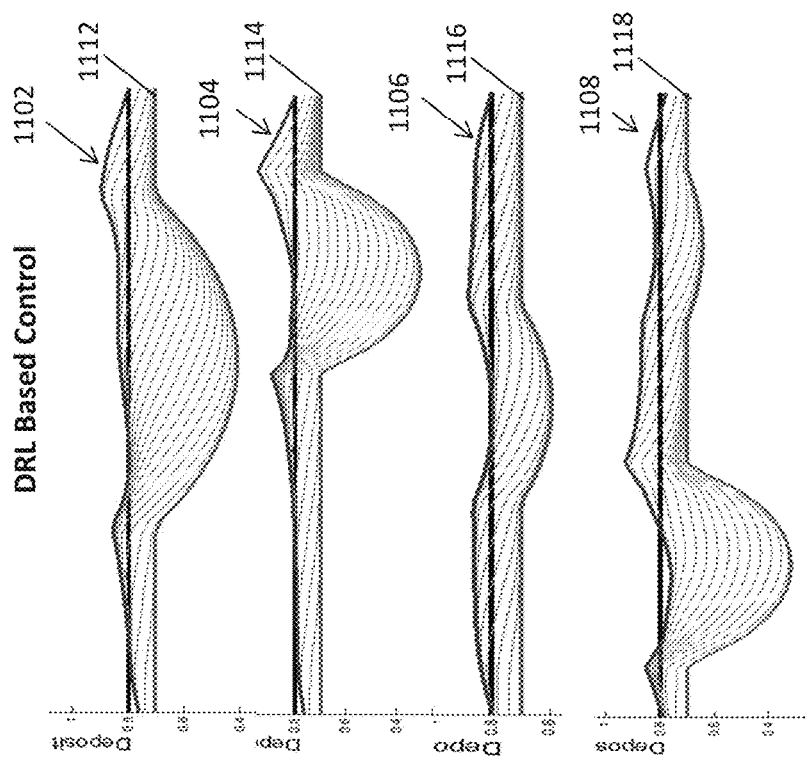
FIG. 11 depicts a sequence of deep reinforcement learning based coldspray applications to various contours according to an embodiment.
Figure 10:
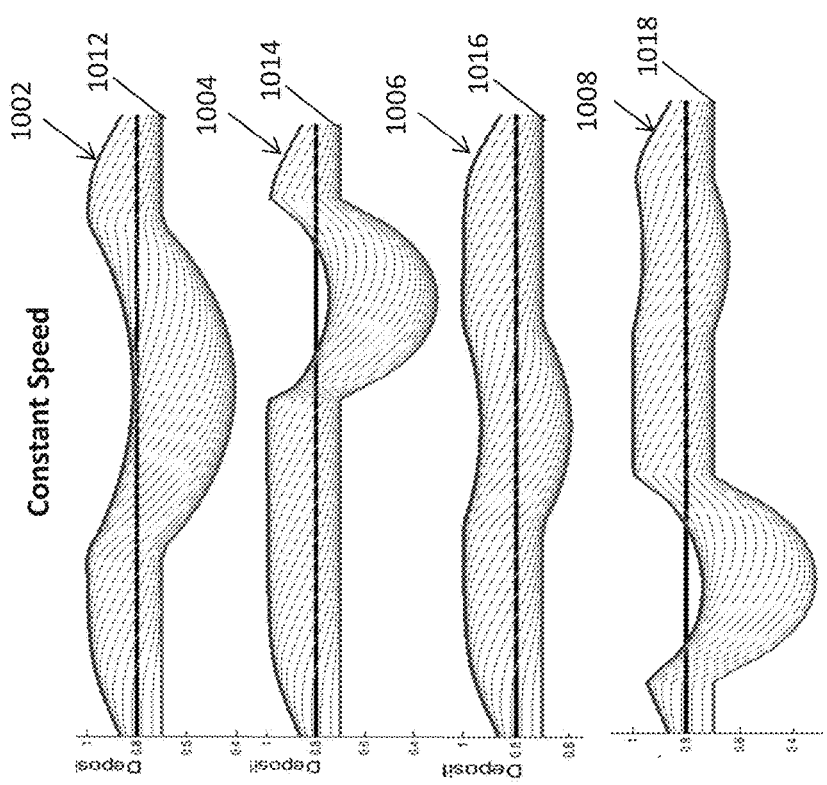
FIG. 10 depicts a sequence of constant speed coldspray applications to various contours.

The refurbishment process 404 can apply a coldspray or other additive manufacturing material to a machined surface with various contours (e.g., semi-circular indentations/cavities in a 3D surface). For example, as depicted in FIG. 9, a machining process 900 can be performed to a damaged surface 902 as a preliminary step to form a contoured surface 905 prior to coldspray application. Although training applied to learn control policies 402 of FIG. 4 is based on a limited training set, the deep reinforcement learning enables adaptation to a wide variety of contours, including patterns not previously experienced. FIG. 10 depicts a resulting finish 1002, 1004, 1006, and 1008 when a constant speed coldspray application is applied to various contoured surfaces 1012, 1014, 1016, and 1018 without the benefit of DRL-based control. FIG. 11 depicts contoured surfaces 1112, 1114, 1116, and 1118 that are equivalent to the contoured surfaces 1012-1018 of FIG. 10. Through the use of machine learning 312, the control policies 402 of FIG. 4 produce actions that result in a much flatter finish with less excess material application on finishes 1102, 1104, 1106, and 1108 of FIG. 11 as compared to the finishes 1002-1008 of FIG. 10 resulting from constant speed coldspray application.

Figure 5:
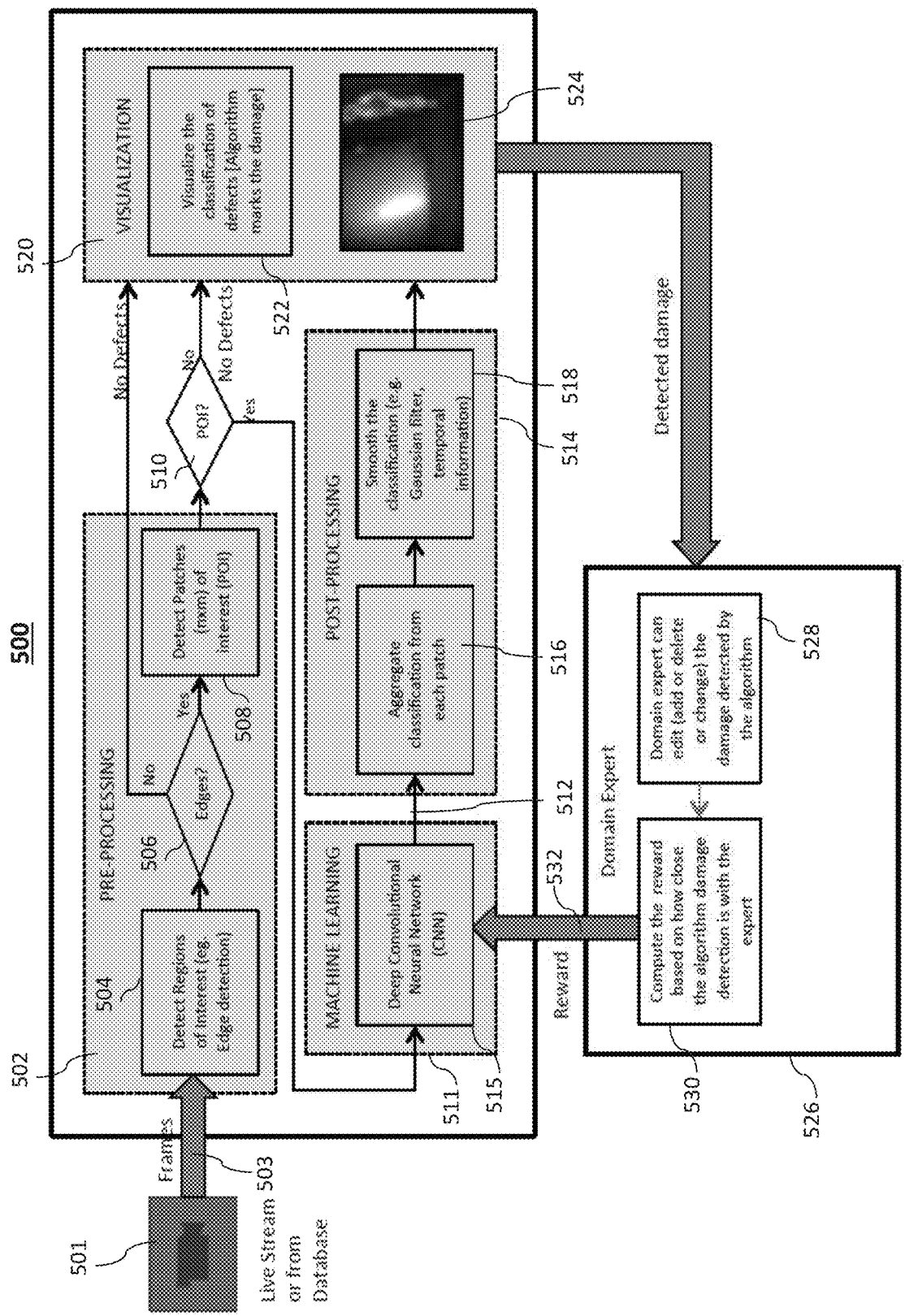
FIG. 5 illustrates an example of a defect detection process using deep reinforcement learning according to an embodiment.

FIG. 5 shows a defect detection process 500 for a boroscope DRL method. A streaming boroscope video 501 is acquired and pre-processed 502 initially. A DNN (such as a CNN) can be used to detect a crack and provide image data to a visualization process 520. For example, a region-of-interest detector 504 analyzes frames of image data 503 from the streaming boroscope video 501 or a database to detect any regions of interest, such as edges. The region-of-interest detector 504 can perform edge detection or other types of region detection known in the art. If no edges (and thus no defects) are detected by the region-of-interest detector 504, then processing of the frames of image data 503 continues as more samples/frames of data are acquired. If at least one region of interest is detected by the region-of-interest detector 504, then block 506 passes the region of interest information to a patch detector 508. The patch detector 508 can detect patches (i.e., areas) of interest based on the regions of interest identified by the region-of-interest detector 504. A threshold can be applied on a percentage of pixels with edges in a given patch to reduce the data set size passed to the CNN 515 of machine learning 511.

At block 510, if the patch detector 508 does not detect at least one patch of interest (i.e., no defects), then processing of the frames of image data 503 continues as more samples/ frames of data are acquired. If the patch detector 508 detects one or more patches of interest in the frames of image data 503, then the machine learning 511 is applied to the one or more patches of interest using CNN 515 (e.g., DNN 102 of FIG. 1). In the example of FIG. 5, a result or action of the machine learning 511 includes classification values 512 that are provided to post-processing 514. The classification distinguishes between normal edges and cracks/defects, for instance.

The post-processing 514 can include aggregating 516 the classification values 512 and smoothing 518 the classification to identify a dominating label representing a defect classification level. When classifications are aggregated from each patch for a given frame, a dominating (i.e., most common) label is used as a final post-processing result for defect classification. The visualization process 520 includes visualizing classification of defects 522 by outputting visual indication 524 of a classification of defects in structure, e.g., to display 226 of FIG. 2, based on the result of the post-processing 514. The visual indication 524 can be in the form of a heat map overlaid upon the image data to highlight location and severity of the defects, where the heat map applies greater intensity defect/crack visualization for areas that are classified with a greater deviation from normal.

The visual indication 524 can be observed by a domain expert 526. The domain expert 526 can edit 528 the visual indication 524 to modify the damage detected by the algorithm. A reward 532 can be computed 530 based on how close the algorithm damage detection aligns with the damage identified by the domain expert 526. The domain expert 526 can provide the reward 532 in terms of whether the CNN 515 was able to identify all the cracks in a specific image. The reward 532 is then acquired by the CNN 515, and the parameters are updated to make the training more efficient.

Figure 6:
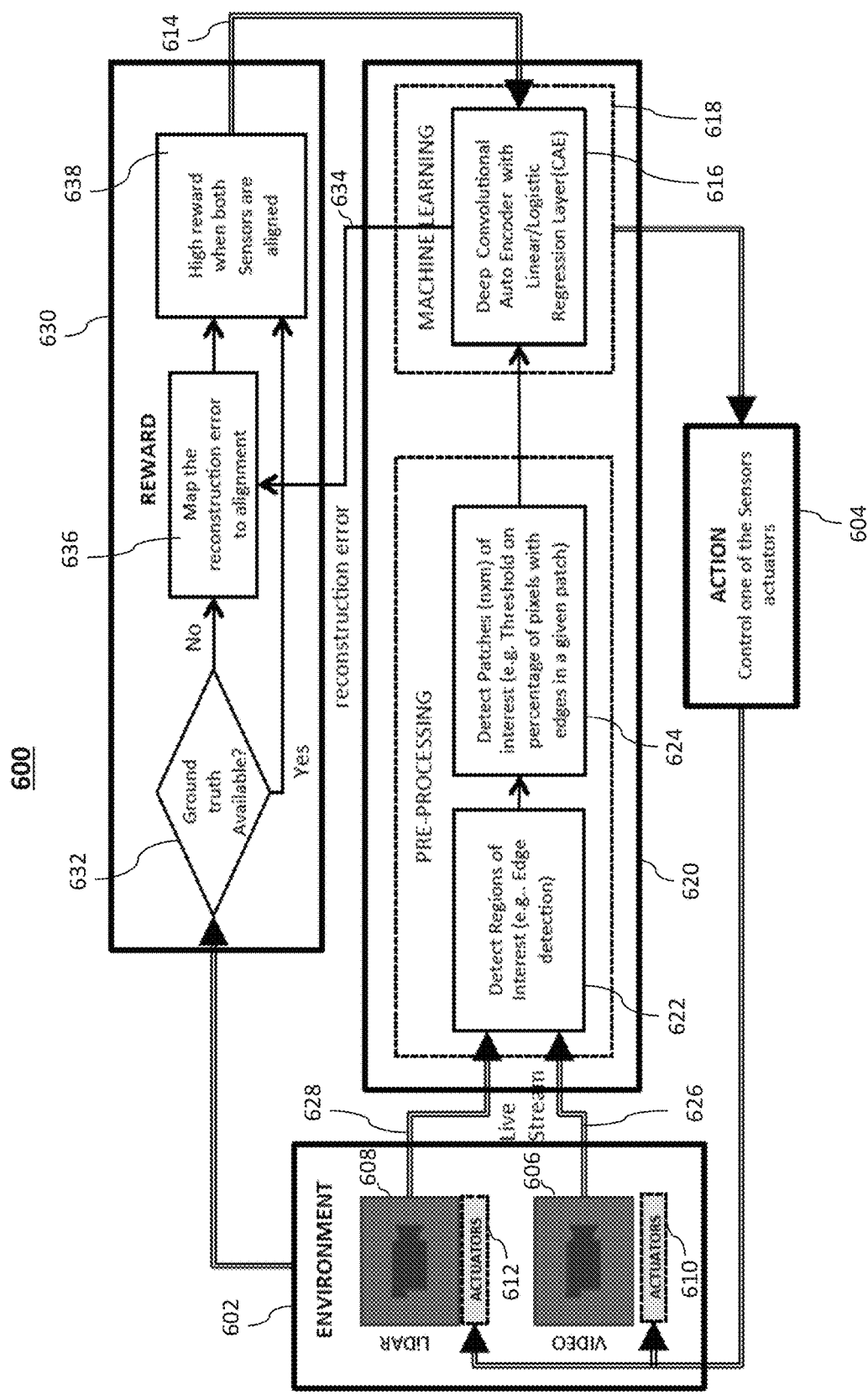
FIG. 6 illustrates an example of a sensor alignment process using deep reinforcement learning according to an embodiment.

FIG. 6 illustrates an example of a sensor alignment process 600 using deep reinforcement learning according to an embodiment. Navigation and situational awareness of optionally manned vehicles requires the integration of multiple sensing modalities such as LiDAR and video, but could be extended to other modalities including RADAR, SWIR and Global Positioning Systems. Spatio-temporal registration of information from multimodal sensors can be performed using known techniques. For many tasks, such as pedestrian and object detection tasks that make use of multiple sensors, decision support methods rest on the assumption of proper registration. The ability to dynamically register information from available data channels for perception related tasks can alleviate the need for anchor points between sensor modalities. Auto-registration may be a prerequisite need for operating on multi-modal information with confidence. The process 600 can be used to solve a multiple sensor alignment problem with DRL.

FIG. 6 shows LIDAR/video alignment using DRL agents. Here, an environment 602 includes multiple sensor modalities such as LIDAR, video, RADAR, etc. In the example of FIG. 6, the environment 602 includes an imaging sensor 606 that can be positioned using actuator 610 and a ranging sensor 608 that can be positioned using actuator 612. An action 604 taken is to control sensors 606, 608 so that the data is aligned correctly. A reward token 614 is at a maximum when the sensor data is aligned after reconstruction from a CAE 616 by machine learning 618. In this case, a DRL agent 620 that includes machine learning 618 understands the alignment of the sensor data to update the parameters and train on the dataset accordingly.

Video frame data 626 and LiDAR data 628 can be fused as multiple channels for pre-processing 620. In pre-processing 620, a region-of-interest detector 622 can perform edge detection or other types of region detection known in the art. A patch detector 624 can detect patches (i.e., areas) of interest based on the regions of interest identified by the region-of-interest detector 622 as part of pre-processing 620. Although depicted as a CAE 616, the machine learning 618 can use a CAE or a deep neural network auto encoder (DNN-AE), and more generally, a deep auto-encoder.

Reward processing 630 can determine whether a ground truth 632 is available for comparison. If no ground truth 632 is available, then a reconstruction error 634 from the CAE 616 can be mapped to the alignment at block 636; otherwise, the ground truth 632 can be used. At block 638, a higher value of the reward 614 is set when both sensors 606, 608 are aligned.

As the number of channels and modalities of information increase, modeling perception systems becomes difficult if not impossible in part due to the large overhead of creating and operating registration methods, especially for real-time streaming applications. The process 600 removes the need for timely expert based feature creation and implicitly generates expressive data features which have been demonstrated to be state of the art in machine learning. The DRL agent 620 can be successfully used for aligning multiple sensor modalities in unmanned autonomous vehicles. The DRL agent 620 can be trained using different sensor modalities and can also be adapted to make decisions for path planning procedures based on the temporal information from the sensors.

Figure 7:
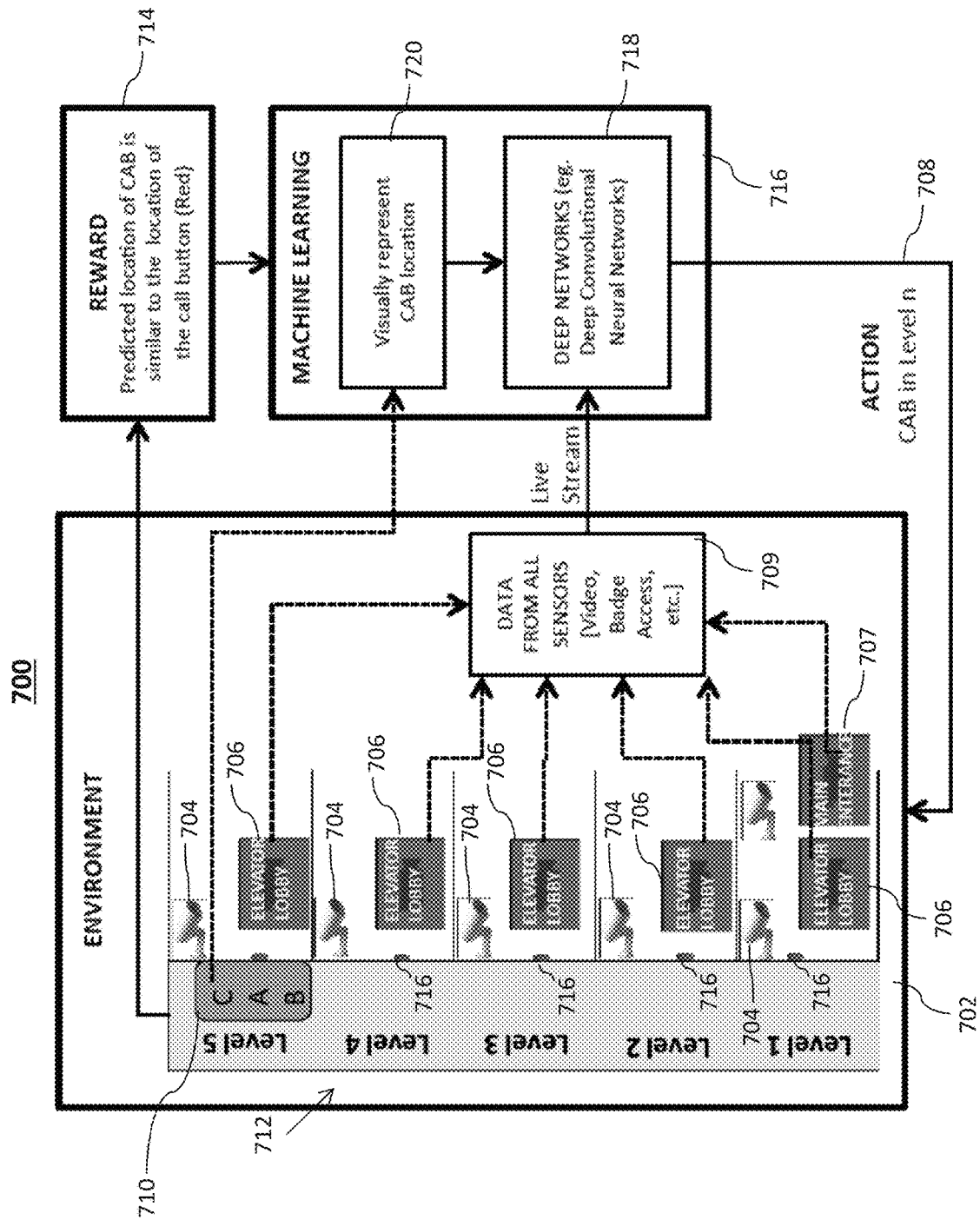
FIG. 7 illustrates an example of an elevator dispatch system using deep reinforcement learning according to an embodiment.

FIG. 7 illustrates an example of an elevator dispatch system 700 using DRL. Here, an environment 702 is indicated by cameras 704 in front of elevators (e.g., elevator lobby 706) and other areas in the building (lobby); Entry/Exit Readers at entrances 707; Smart Phone Data; Office Locations (prior) as sensor data 709. An action taken 708 is by moving an elevator cab 710 up and down to place the elevator cab 710 at different levels 712. A reward token 714 can be when a call button 716 is pressed in Level 1, the elevator cab 710 is supposed to be in Level 1 in less than few seconds or immediately (provided it takes existing passengers to the right floors optimally). From raw camera, time-series, and/or transactional input, machine learning 716 predicts which level 712 to dispatch the elevator cab 710 in an end-to-end fashion. DRL of CNN 718 (e.g., DNN 102 of FIG. 1) evolves over time in identifying the floor activity and the person at the level 712 without the computer vision algorithms. Observing data such as activity of call buttons 716 can be used to visually represent a location of the elevator cab 710 at block 720. An elevator dispatch agent uses machine learning 716 to train itself to arrive at the correct level 712 optimally with minimum time. Minimum latency may be achieved when the elevator cab 710 is predicatively relocated to the level 712 at which the person is about to arrive based on previous temporal information.

Figure 8:
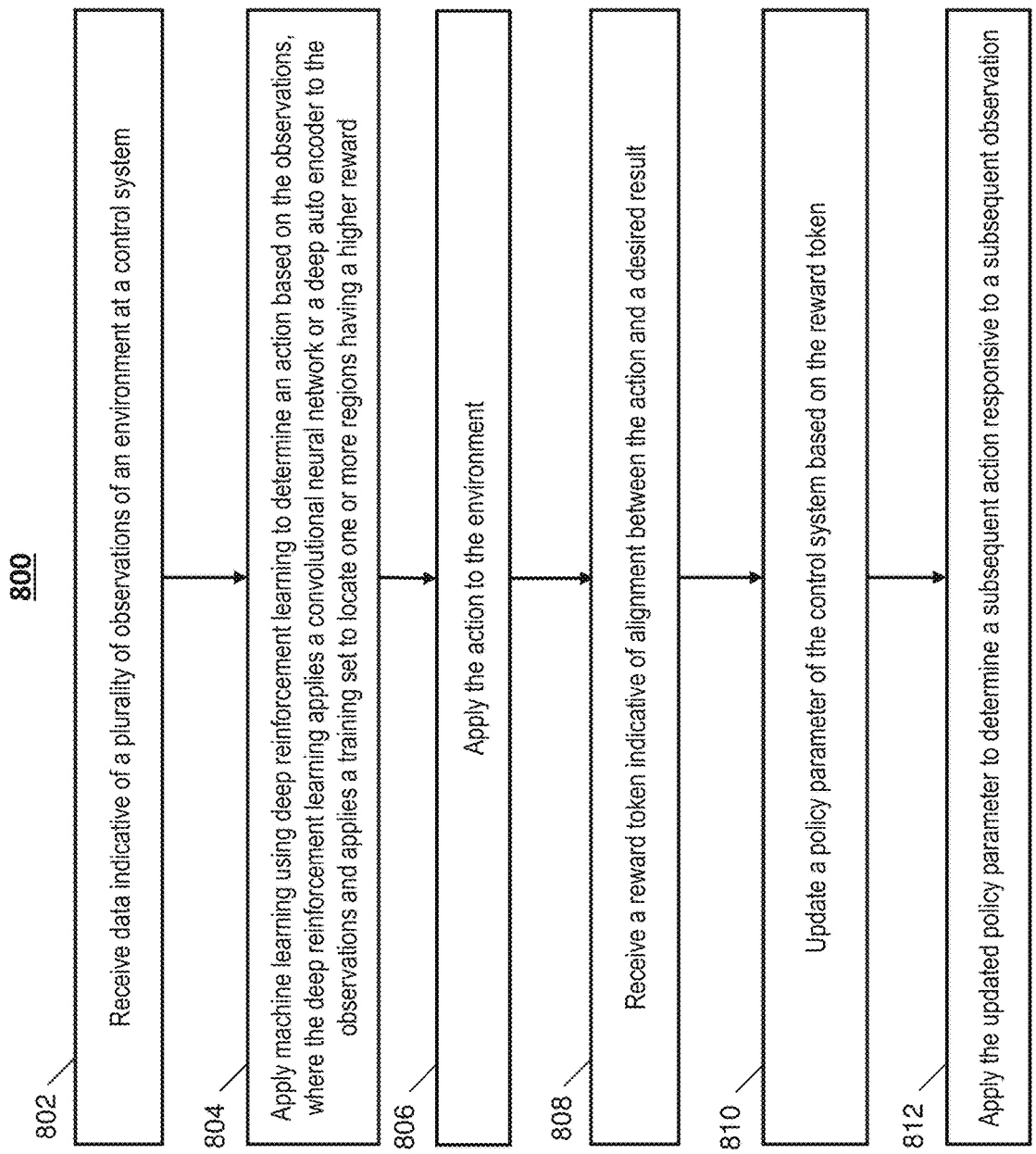
FIG. 8 illustrates a process according to an embodiment.

FIG. 8 is a flow chart illustrating a method 800 for control systems using deep reinforcement learning in accordance with an embodiment. The method 800 of FIG. 8 is described in reference to FIGS. 1-7 and may be performed with an alternate order and include additional steps. For example, the method 800 can be performed by system 200 and/or 700, and/or can embody one or more processes such as processes 300, 400, 500, and/or 600.

At block 802, data indicative of a plurality of observations of an environment at a control system is received. At block 804, machine learning using deep reinforcement learning is applied to determine an action based on the observations. The deep reinforcement learning can apply a convolutional neural network or a deep auto encoder (such as a convolutional auto encoder) to the observations. The deep reinforcement learning can apply a guided policy search or a deep Q-network, for example. The deep reinforcement learning can also apply a training set to locate one or more regions having a higher reward. In some embodiments, the training set is configured at least in part based on expert knowledge input, such as a domain expert mapping good expected trajectories and/or labelling training data to build training distributions.

At block 806, the action is applied to the environment. Depending on the implementation, many different actions can be supported for various systems and environments. For example, the action can control a nozzle in a coldspray application, and the observations can determine a deposit characteristic on a surface. The action can control a refurbishing process, and the observations can determine a deposit characteristic on a surface. The action may include a classification of one or more defects in a structure, and a visual indication of the classification of the one or more of defects in the structure can be output. The action may include controlling alignment of a plurality of sensors. As a further example, the action can include controlling movement of at least one elevator cab. Further such applications will be apparent to one of ordinary skill in the art.

At block 808, a reward token is received indicative of alignment between the action and a desired result. At block 810, a policy parameter of the control system is updated based on the reward token. At block 812, the updated policy parameter is applied to determine a subsequent action responsive to a subsequent observation. The updating of the policy parameter may be performed in a simulation environment to develop control policies to apply to a physical environment.

Technical effects and benefits include applying machine learning with deep reinforcement learning to control actions of a control system in a complex environment. Iterative learning can rapidly converge on a solution to support real-time control decisions, thus enhancing control system efficiency and performance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
receiving data indicative of a plurality of observations of an environment of a coldspray application system and/or a component refurbishing system at a control system;
applying an action to the environment in accordance with a control policy of the control system, wherein the action controls a nozzle in the coldspray application and/or the refurbishing process and the observations determine a deposit characteristic on the surface;
receiving a plurality of observations of a simulated version of the environment;
applying machine learning using deep reinforcement learning to determine an action in the simulated version of the environment based on the observations;
applying the action to the simulated version of the environment;
receiving a reward token indicative of alignment between the action and a desired finishing of a surface in the simulated version of the environment;
updating a policy parameter of the control system based on the reward token; and
applying the updated policy parameter to determine a subsequent action responsive to a subsequent observation.

2. The method of claim 1, wherein the deep reinforcement learning applies a guided policy search.

3. The method of claim 1, wherein the deep reinforcement learning applies a deep Q-network.

4. The method of claim 1, wherein the action comprises a classification of one or more defects in a structure, and the method further comprises:
outputting a visual indication of the classification of the one or more of defects in the structure.

5. The method of claim 1, wherein a training set for machine learning is configured at least in part based on expert knowledge input.

6. The method of claim 1, wherein the action comprises controlling a speed and an angle of the nozzle.

7. The method of claim 6, wherein controlling the speed and the angle of the nozzle is based on determining a control sequence such that a final material profile matches a prescribed profile computed using a weighted sum of a time to complete a pass of the nozzle and a penalty on angular rate.

8. A system comprising:
a control system; and
a processing system configured to:
receive data indicative of a plurality of observations of an environment of a coldspray application system and/or a component refurbishing system at the control system;
apply an action to the environment in accordance with a control policy of the control system, wherein the action controls a nozzle in the coldspray application and/or the refurbishing process and the observations determine a deposit characteristic on the surface;
receive a plurality of observations of a simulated version of the environment;
apply machine learning using deep reinforcement learning to determine an action in the simulated version of the environment based on the observations;
apply the action to the simulated version of the environment;
receive a reward token indicative of alignment between the action and a desired finishing of a surface in the simulated version of the environment;
update a policy parameter of the control system based on the reward token; and
apply the updated policy parameter to determine a subsequent action responsive to a subsequent observation.

9. The system of claim 8, wherein the deep reinforcement learning applies a guided policy search.

10. The system of claim 8, wherein the deep reinforcement learning applies a deep Q-network.

11. The system of claim 8, wherein the action comprises a classification of one or more defects in a structure, the system further comprises a display, and a visual indication of the classification of the one or more of defects in the structure is output to the display.

12. The system of claim 8, wherein a training set for machine learning is configured at least in part based on expert knowledge input.

13. The system of claim 8, wherein the action comprises controlling a speed and an angle of the nozzle.

14. The system of claim 13, wherein controlling the speed and the angle of the nozzle is based on determining a control sequence such that a final material profile matches a prescribed profile computed using a weighted sum of a time to complete a pass of the nozzle and a penalty on angular rate.

* * * * *